United States Patent
Li et al.

(10) Patent No.: US 10,250,177 B2
(45) Date of Patent: Apr. 2, 2019

(54) FLOATING GROUND ASSEMBLY FOR ELECTRIC MOTOR CONTROL ASSEMBLY

(71) Applicant: REGAL BELOIT AMERICA, INC., Beloit, WI (US)

(72) Inventors: Ming Li, Fort Wayne, IN (US); Roger Carlos Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 49 days.

(21) Appl. No.: 15/602,858

(22) Filed: May 23, 2017

(65) Prior Publication Data
US 2018/0342973 A1 Nov. 29, 2018

(51) Int. Cl.
| | |
|---|---|
| H02P 27/06 | (2006.01) |
| H02K 11/33 | (2016.01) |
| H02K 11/40 | (2016.01) |
| H02K 5/22 | (2006.01) |
| H02K 15/00 | (2006.01) |
| H02M 1/084 | (2006.01) |
| H02M 5/458 | (2006.01) |

(52) U.S. Cl.
CPC ............. *H02P 27/06* (2013.01); *H02K 5/225* (2013.01); *H02K 11/33* (2016.01); *H02K 11/40* (2016.01); *H02K 15/00* (2013.01); *H02M 1/084* (2013.01); *H02M 5/458* (2013.01)

(58) Field of Classification Search
CPC ................. H01H 83/20; G01R 31/025; H03K 19/018557; H03K 17/6874; G01B 5/3133
See application file for complete search history.

(56) References Cited

U.S. PATENT DOCUMENTS

| | | | |
|---|---|---|---|
| 5,789,968 A * | 8/1998 | John | H03K 17/6874 327/427 |
| 6,980,173 B2 | 12/2005 | Man et al. | |
| 7,385,438 B2 | 6/2008 | Pelly | |
| 8,013,612 B2 * | 9/2011 | Morini | G01R 31/025 324/509 |
| 8,040,632 B2 * | 10/2011 | Jang | G11B 5/3133 360/125.74 |
| 2003/0080772 A1 | 5/2003 | Giacomini et al. | |
| 2003/0231046 A1 * | 12/2003 | Giacomini | H03K 19/018557 327/333 |
| 2009/0102488 A1 * | 4/2009 | Morini | G01R 31/025 324/509 |
| 2015/0109077 A1 * | 4/2015 | Tomimbang | H01H 83/20 335/7 |

* cited by examiner

*Primary Examiner* — Rina I Duda
(74) *Attorney, Agent, or Firm* — Armstrong Teasdale LLP

(57) ABSTRACT

A ground assembly includes a first layer, a second layer, and a bypass capacitor. The first layer includes a power ground, a communication ground spaced from the power ground, a conductive path defining a parasitic inductance and electrically coupled between the power ground and the communication ground, and an electrically insulating layer. At least a portion of the insulating layer is positioned between the power and communication grounds. The second layer includes a first substrate that is spaced from the power ground to define a first parasitic capacitance therebetween and is spaced from the communication ground to define a second parasitic capacitance therebetween. The bypass capacitor is electrically coupled between the power ground and the first substrate.

16 Claims, 8 Drawing Sheets

FLOATING GROUND ASSEMBLY FOR ELECTRIC MOTOR CONTROL ASSEMBLY

BACKGROUND

The field of the disclosure relates generally to electric motor control systems, and more particularly, ground assemblies for isolating wireless communication modules from noise generated by the motors and motor control systems.

At least some known motor control systems include power switches for generating a motor control signal for an electric motor. The motor control systems may further include a wireless communication interface to facilitate remote control of the motor control system and thereby the motor. Some motor control systems may include both the power switches and the wireless communication interface within one package, printed circuit board (PCB), or other enclosure.

Noise current generated by the power switches and other components of the motor or motor control system may affect the performance (e.g., communication range, quality, open communication bands, etc.) of the wireless communication interface, particularly noise current having a frequency similar to or greater than the communication frequency range of the interface. In some systems, the noise current from the power switches is coupled to the communication module through a common ground. A common ground is used in electrical circuits for safety purposes and is typically required for electric motor systems. However, the noise current coupled from the common ground to the communication interface may reduce wireless communication capability or render the wireless communication capability inoperable.

BRIEF DESCRIPTION

In one aspect, a ground assembly for a motor management module includes a first layer, a second layer, and a bypass capacitor. The first layer includes a power ground, a communication ground spaced from the power ground, a conductive path defining a parasitic inductance and electrically coupled between the power ground and the communication ground, and an electrically insulating layer. At least a portion of the insulating layer is positioned between the power and communication grounds. The second layer includes a first substrate that is spaced from the power ground to define a first parasitic capacitance therebetween and is spaced from the communication ground to define a second parasitic capacitance therebetween. The bypass capacitor is electrically coupled between the power ground and the first substrate.

In another aspect, a motor control assembly includes a motor management module. The motor management module includes a power module configured to generate a motor control signal associated with a motor, a communication module, and a ground assembly. The ground assembly includes a first layer, a second layer, and a bypass capacitor. The first layer includes a power ground electrically coupled to the power module, a communication ground electrically coupled to the communication module and spaced from the power ground, a conductive path electrically coupled between the power ground and the communication ground and defining a parasitic inductance, and an electrically insulating layer. At least a portion of the insulating layer is positioned between the power ground and the communication ground. The second layer includes a first substrate that is spaced from the power ground to define a first parasitic capacitance therebetween, and that is spaced from the communication ground to define a second parasitic capacitance therebetween. The bypass capacitor is electrically coupled between the power ground and the first substrate.

In yet another aspect, a method for manufacturing a ground assembly for a motor management module is provided. The ground assembly includes a first layer, a second layer, and a bypass capacitor. The method includes forming the second layer by depositing a first substrate material to define a first substrate, forming the first layer above the second layer by depositing an insulating material and a conductive material, forming the conductive material into a power ground, a communication ground spaced from the power ground, and a conductive path electrically coupled between and defining a parasitic inductance between the power ground and the communication ground. The power ground and the first substrate define a first parasitic capacitance therebetween. The communication ground and the first substrate define a second parasitic capacitance therebetween. The method further includes forming an insulating layer using the insulating material. At least a portion of the insulating layer is positioned between the power ground and the communication ground. The method also includes electrically connecting the bypass capacitor between the power ground and the first substrate.

DETAILED DESCRIPTION

Figure 1:
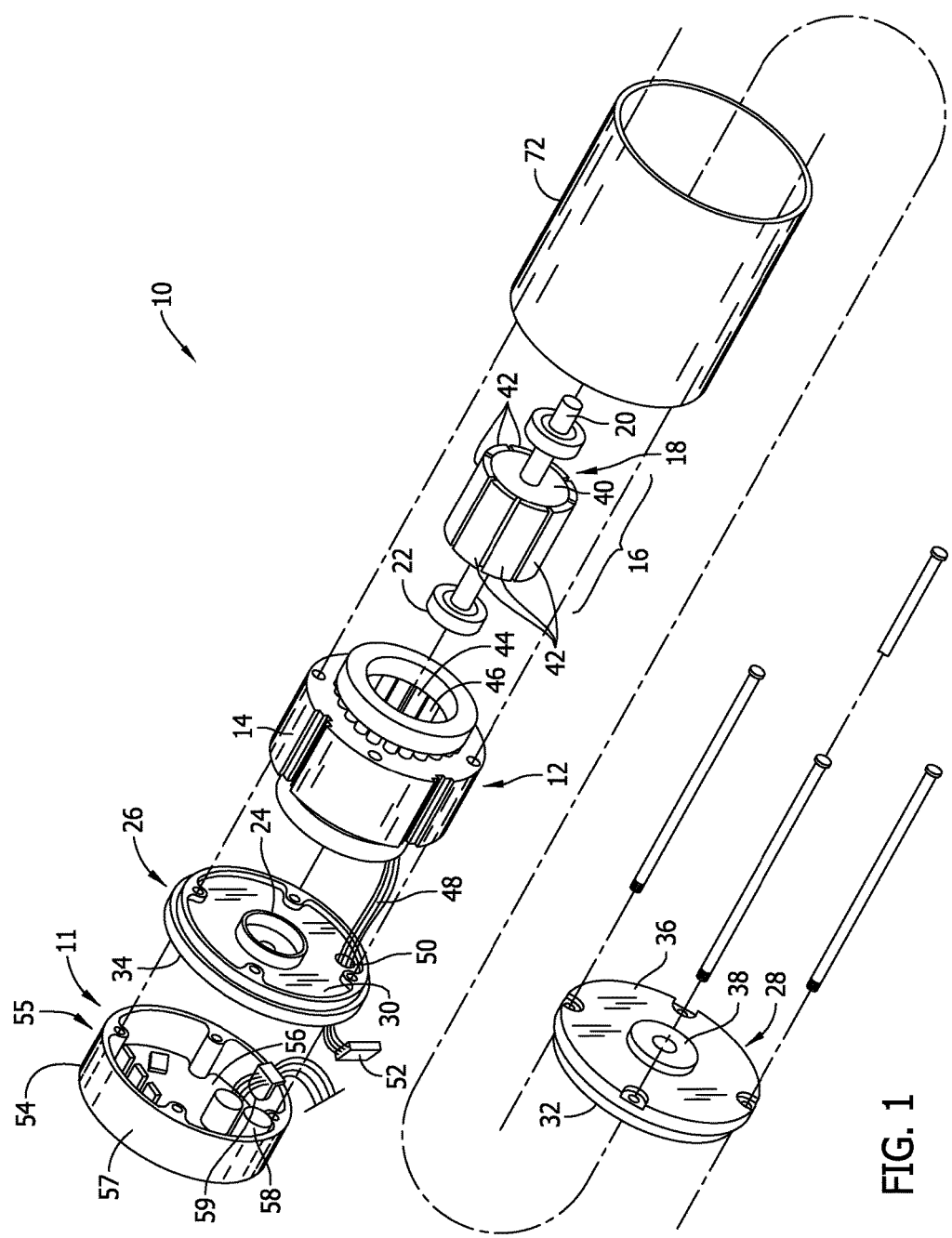
FIG. 1 is an exploded view of an exemplary electric motor.

Embodiments of the motor control assembly and methods of manufacture described herein facilitate reduced noise coupling between a wireless communication module and a power module of the motor control assembly, thereby improving the communications of the communication module.

As described herein, a motor control assembly includes a motor management module that controls operation of an electric motor. The motor management module includes a power module and a communication module. The power module includes power switches for generating an alternating current (AC) or pulse control signal to operate the motor. The communication module is configured for wireless communication with an external controller or other computing device to enable remote control of the motor. That is, a motor control command signal received by the communication module is used to control operation of the power module and thereby control operation of the motor. To limit the effect of noise generated by the power module on the communication module, the motor management module includes a floating ground assembly. The floating ground assembly electrically couples the power module and the communication module to a common or global ground via capacitive coupling such that the power and communication modules are not directly connected to the common ground through the ground assembly.

The ground assembly includes a first layer, a second layer, and a third layer. The second layer is coupled between the first and third layers. Parasitic capacitances are defined between the layers to couple the communication and power modules to a common ground via capacitive coupling. The first layer includes a power ground, a communication ground, a conductive path, and an insulating layer. The power ground is electrically coupled to the power module, the communication ground is electrically coupled to the communication module, and at least a portion of the insulating layer is positioned between the power ground and the communication ground. The conductive path extends between the power ground and the communication ground and defines a parasitic inductance. A dielectric layer is positioned between the second layer and both the power and communication grounds.

The second layer includes a first substrate coupled to the dielectric layer. The power ground and the first substrate define a first parasitic capacitance therebetween. Similarly, the communication ground and the first substrate define a second parasitic capacitance therebetween. A bypass capacitor is electrically coupled between the power ground and the first substrate. The capacitance of the bypass capacitor is greater than the first and second parasitic capacitances such that a relatively larger portion of noise coupling current, such as noise coupling current from the power switches within the power module, is directed through the bypass capacitor. The first substrate is also coupled to a thermal interface on a surface opposite the surface coupled to the dielectric layer. The thermal interface is coupled between the first substrate and a second substrate of the third layer. A third parasitic capacitance is defined between the first and second substrates. The second substrate is coupled to or operates as a common ground for the motor management module. Although the first substrate is a floating ground for the power and communication modules, the capacitive coupling between the substrates facilitates electrically coupling the power and communication modules to the common ground.

The parasitic capacitances, the parasitic inductance, and the bypass capacitance of the bypass capacitor facilitate limiting noise current from affecting the communications of the communication module. That is, the bypass capacitance, in combination with the first parasitic capacitance, directs at least a portion of noise coupling current away from the communication ground. The conductive path acts as a choke to prevent relatively high-frequency noise current passing from the power ground to the communication ground (and thereby the communication module). The use of capacitive coupling through parasitic capacitance of a floating ground assembly reduces the effective parasitic capacitance of the motor control assembly while enabling the communication module to function with limited interruption due to noise coupling current.

FIG. 1 is an exploded view of an exemplary electric motor 10. Motor 10 includes control system 11, a stationary assembly 12 including a stator or core 14, and a rotatable assembly 16 including a rotor 18 and a shaft 20. In the exemplary embodiment, motor 10 is utilized as a fan and/or blower motor in a fluid (e.g., water, air, etc.) moving system. For example, electric motor 10 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, motor 10 may be implemented in any application that enables motor 10 to function as described herein. Motor 10 may also be used to drive mechanical components other than a fan and/or blower, including mixers, gears, conveyors, and/or treadmills. In the exemplary embodiment, control system 11 is integrated with motor 10. Alternatively, motor 10 may be external to and/or separate from control system 11.

Rotor 18 is mounted on and keyed to shaft 20 journaled for rotation in conventional bearings 22. Bearings 22 are mounted in bearing supports 24 integral with a first end member 26 and a second end member 28. End members 26 and 28 have inner facing sides 30 and 32 between which stationary assembly 12 and rotatable assembly 16 are located. Each end member 26 and 28 has an outer side 34 and 36 opposite its inner side 30 and 32. Additionally, second end member 28 has an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction, and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a motor connector 52. While stationary assembly 12 is illustrated for purposes of disclosure, it is contemplated that other stationary assemblies of various other constructions having different shapes and with different number of teeth may be utilized within the scope of the invention.

Motor 10 further includes an electronics enclosure 54 which mounts on the rear portion of motor 10 to house control system 11. That is, electronics enclosure 54 defines an internal chamber 60 in which control system 11 is positioned. Electronics enclosure 54 and control system 11 may sometimes be referred to collectively as a motor control assembly 55. Electronics enclosure 54 includes a bottom wall 56 and a substantially annular side wall 57. Control system 11 includes a plurality of electronic components 58 and a connector 59 mounted within electronics enclosure 54. Control system 11 is connected to winding stages 44 by interconnecting motor connector 52. Control system 11 applies a voltage to one or more of winding stages 44 at a time for commutating winding stages 44 in a preselected sequence to rotate rotatable assembly 16 about an axis of rotation. In an alternative embodiment, control system 11 is remotely positioned from and communicatively coupled to motor 10. In another alternative embodiment, control system 11 is a central control system for more than one electric motor (e.g., in an HVAC system), and is communicatively coupled to motor 10.

A casing 72 is positioned between first end member 26 and second end member 28 to facilitate enclosing and protecting stationary assembly 12 and rotatable assembly 16.

Figure 2:
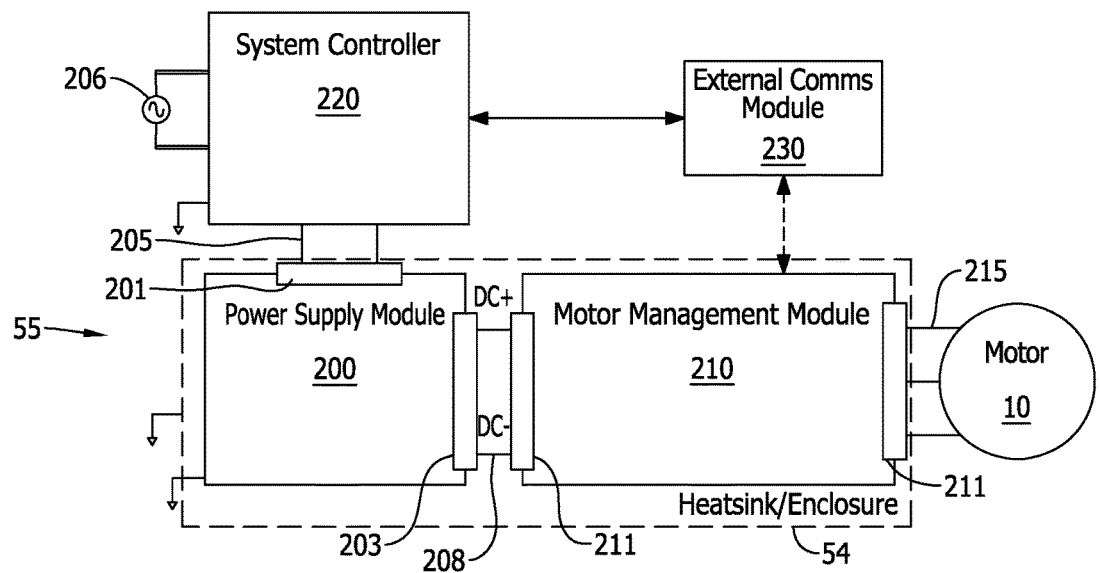
FIG. 2 is a block diagram of an exemplary motor control assembly for controlling operation of the electric motor shown in FIG. 1, including a motor management module.
Figure 3:
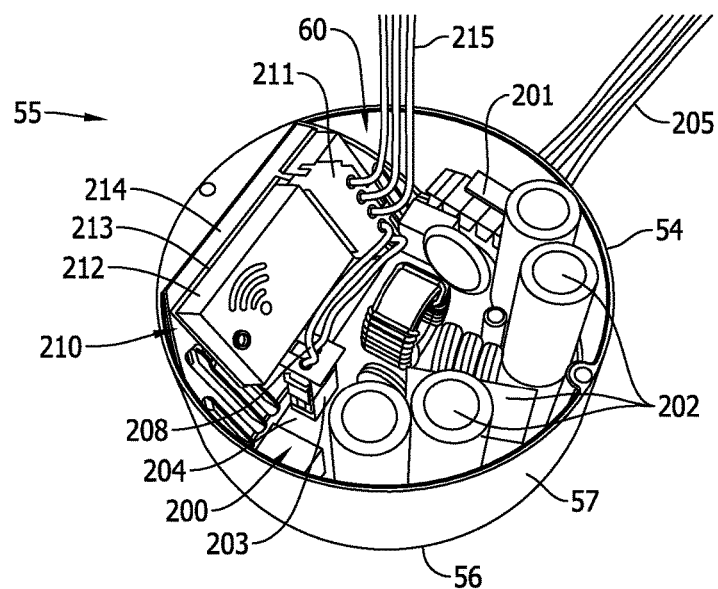
FIG. 3 is a perspective view of the motor control assembly shown in FIGS. 1 and 2, including the motor management module.
Figure 4:
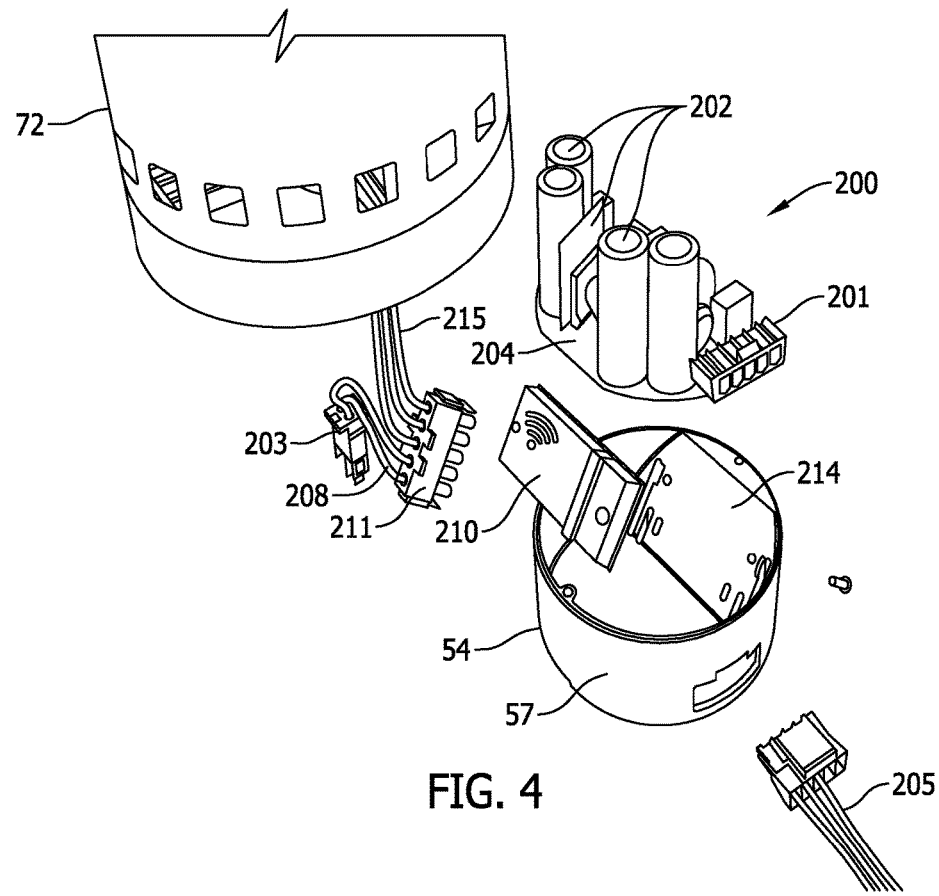
FIG. 4 is an exploded perspective view of the motor control assembly shown in FIGS. 1-3.

FIG. 2 is a block diagram of an exemplary motor control assembly 55 (shown in FIG. 1) for controlling operation of electric motor 10 including a motor management module 210 for reducing moisture damage to signal components. FIG. 3 is a perspective view of motor control assembly 55 including the motor management module 210. FIG. 4 is an exploded perspective view of motor control assembly 55. In the exemplary embodiment, motor control assembly 55 includes electronics enclosure 54, which houses control system 11. Control system 11 includes a power supply module 200 and motor management module 210 that is physically separate from, but in electrical connection with power supply module 200.

Power supply module 200 includes an input connector 201 a plurality of electrical components 202, and an output connector 203 mounted on a component board, such as a printed circuit board (PCB) 204. Power supply module 200 integrates large through-hole electrical components and power connectors of control system 11 that are not sensitive to moisture. In the exemplary embodiment, PCB 204 is coupled to an interior surface of bottom wall 56 of electronics enclosure 54.

In the exemplary embodiment, input connector 201 includes power input line connectors 205 for coupling to a power source 206. Input connector 201 interfaces with and receives input power from power source 206 via an opening in side wall 57 of electronics enclosure 54. In some embodiments, power is supplied via a system controller 220, such as an HVAC system controller.

Electrical components 202 of power supply module 200 are configured to convert input voltage received from power source 206 to a desired level of direct current (DC) voltage. Using output connector 203, power supply module 200 outputs the converted DC voltage to motor management module 210. Output connector 203 includes two high-voltage wires 208 for providing the converted DC voltage to motor management module 210.

Figure 5:
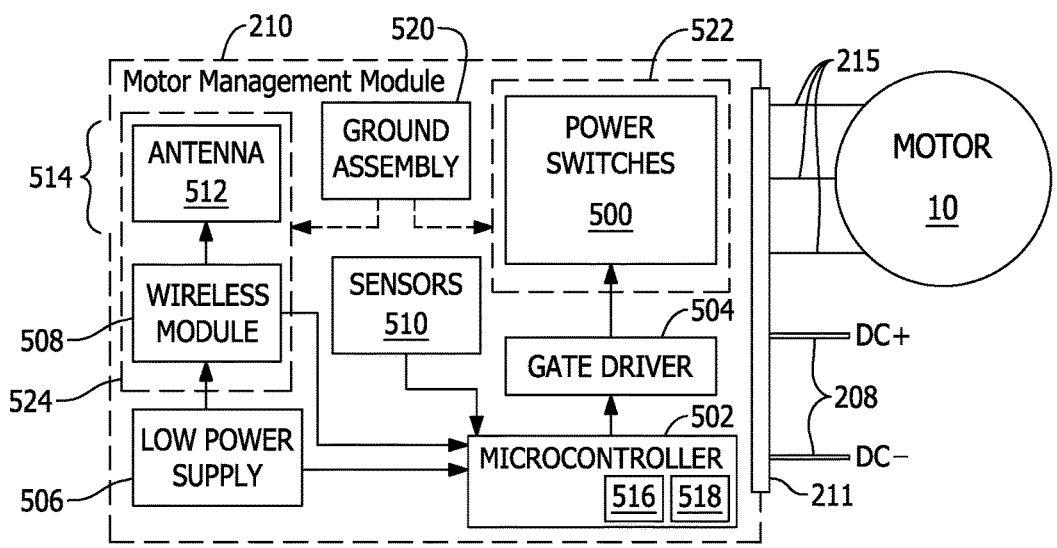
FIG. 5 is a block diagram of an exemplary motor management module for use with the motor control assembly shown in FIG. 1.

Motor management module 210 includes an input/output connector 211 and electrical components (shown in FIG. 5). Motor management module 210 houses moisture-sensitive electrical components of control system 11 within an encapsulated, heat-sharing package 212 that provides protection from damage and/or failure due to moisture entering electronics enclosure 54, as described in more detail herein.

Heat-sharing package 212 includes an insulated metal substrate 213 coupled to a metal heatsink 214 formed in side wall 57 of electronics enclosure 54. For example, heat-sharing package 212 may include an insulated metal substrate (IMS) or a thick printed copper (TPC) based packaging to integrate high power semiconductor devices and all moisture-sensitive components such as integrated circuits and surface mount resistors. Heat generated by electrical losses of the semiconductor devices causes the elements mounted on the heat sharing package 212 to operate at relatively higher temperatures.

Input/output connector 211 is coupled to high-voltage wires 208 for receiving the converted DC voltage from power supply module 200. Motor management module 210 converts the DC voltage to a three-phase alternating current (AC) voltage for driving electric motor 10 based on instructions received from an external device, for example, an HVAC system controller. Input/output connector 211 outputs the three-phase AC voltage to winding stages 44 of motor 10 via output power wires 215.

In the exemplary embodiment, an external communications module 230 is communicatively coupled to motor management module 210 as well as system controller 220. More specifically, in the exemplary embodiment, external communications module 230 is removably couplable to system controller 220 using a communication wire, and is communicatively coupled to motor management module 210 using wireless communication. However, external communications module 230 may also be communicatively coupled to system controller 220 using wireless communication. Alternatively, in some embodiments, external communications module 230 is integral to system controller 220. External communications module 230 is controlled by a user, such as an original equipment manufacturer (OEM), and enables control of motor operation by transmitting control signals to system controller 220 and/or motor management module 210.

FIG. 5 is a block diagram of an exemplary motor management module 210 (shown in FIGS. 2-4). In the exemplary embodiment, motor management module 210 includes input/output connector 211 for receiving the DC voltage from power supply module 200, power semiconductor switches 500 for switching the DC power to the motor phases as AC power, a microcontroller 502 for implementing an algorithm to control one or more gate drivers 504 to operate power semiconductor switches 500, a low voltage power supply 506 and associated internal circuitry for providing low voltage power to microcontroller 502 from a higher voltage that is applied to entire motor management module 210, and input/output connector 211 for coupling to motor winding stages. In the exemplary embodiment, low voltage power supply 506 is a DC-DC converter that supplies low voltage sources to microcontroller 502 and to a wireless communications module 508.

In the exemplary embodiment, motor management module 210 also includes a plurality of sensors 510 for providing data to microcontroller 502. Sensors 510 are configured to measure various operating parameters associated with the operation of motor 10, including voltage measurements, current measurements, temperature measurements, vibration measurements, and/or any other known measurements associated with operating an electric motor or the operating environment. Sensors 510 are contained within heat-sharing package 212 and do not require penetration out of package 212, which would create potential for moisture penetration.

In the exemplary embodiment, motor management module 210 further includes wireless communication module 508 for communicating with an external device to receive a motor control command signal, which is used by microcontroller 502 to switch power semiconductor switches 500 to drive motor 10 at an appropriate level. Wireless communication module 508 communicates with one or more remote devices, such as external devices. In the exemplary embodiment, wireless communication module 508 converts a received wireless signal into a control signal that microcontroller 502 utilizes to control operation of electric motor 10. Wireless signals may include, but are not limited to, Bluetooth, Bluetooth low energy, near field communications (NFC), infrared, and/or any other known types of wireless signals. Using wireless communication to communicate with external devices enables elimination of hardwired communication connectors. Such hardwired connectors are a common entry point for moisture, so their removal makes motor 10 more resistant to moisture.

In some embodiments, casing 72 and/or electronics enclosure 54 are manufactured using metal, which may interfere with wireless signals being transmitted to microcontroller 502. As such, motor management module 210 may be positioned adjacent to an opening 514 defined in casing 72 or electronics enclosure 54. Motor management module 210 includes an antenna 512 within the over-molded portion of heat-sharing package 212 such that a wireless signal entering electronics enclosure 54 via opening 514 penetrates package 212 and is received by antenna 512. Antenna 512 enables wireless communication between a user of motor 10 (i.e., a manufacturer of motor 10, an HVAC system manufacturer using motor 10, a technician of motor 10, and/or a customer owning motor 10) with microcontroller 502 to define, change, or override the operating parameters stored in a microcontroller memory device. Positioning antenna 512 adjacent to opening 514 enables wireless signals to be received by antenna 512 and transmitted to microcontroller 502. In some embodiments, antenna 512 is a three-dimensional (3D) antenna or a ceramic antenna. In other embodiments, other suitable types of antennas may be used.

In the exemplary embodiment, microcontroller 502 includes at least one memory device 516 and a processor 518 that is communicatively coupled to memory device 516 for executing instructions. In some embodiments, executable instructions are stored in memory device 516. In the exemplary embodiment, microcontroller 502 performs one or more operations described herein by programming processor 518. For example, processor 518 may be programmed by encoding an operation as one or more executable instructions and by providing the executable instructions in memory device 516.

Processor 518 may include one or more processing units (e.g., in a multi-core configuration). Further, processor 518 may be implemented using one or more heterogeneous processor systems in which a main processor is present with secondary processors on a single chip. As another illustrative example, processor 518 may be a symmetric multiprocessor system containing multiple processors of the same type. Further, processor 518 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 518 controls operation of microcontroller 502.

In the exemplary embodiment, memory device 516 is one or more devices that enable information such as executable instructions and/or other data to be stored and retrieved. Memory device 516 may include one or more computer readable media, such as, without limitation, an NFC electrically erasable programmable read-only memory (EEPROM), a standard EEPROM, dynamic random access memory (DRAM), static random access memory (SRAM), a solid state disk, and/or a hard disk. Memory device 516 may be configured to store, without limitation, application source code, application object code, source code portions of interest, object code portions of interest, configuration data, execution events and/or any other type of data. In the exemplary embodiment, memory device 516 includes firmware and/or initial motor configuration data for microcontroller 502. Moreover, in the exemplary embodiment, memory device 516 stores diagnostic data associated with operation of motor 10, for transmission to one or more external devices upon request. Diagnostic data includes, but is not limited to including, time powered, time run, time run above 80% demand, time in speed cutback region, time in temperature cutback region, good starts, failed starts, resets, stalls, number of bad serial packets received, watchdog shutdown events, time run in certain demand ranges, thermal shock events, power module temperature, bus voltage, open-phase events, UL lockouts, reverse start attempts, shaft watts, and torque.

In at least some embodiments, wireless module 508 may be sensitive to noise interference generated by motor management module 210, motor control assembly 55 (shown in FIG. 1), wires 208, and/or motor 10. For example, power switches 500 generate noise from switching. The common-mode noise current generated by power switches 500 may be coupled to wireless module 508 via a common ground. The noise may disrupt communications with wireless module 508, thereby preventing the motor control command signal from being received and used to operate motor management module 210.

In the exemplary embodiment, motor management module 210 includes a ground assembly 520 electrically coupled to at least some of the components of motor management module 210. More specifically, ground assembly 520 is electrically coupled to a power module 522 and a communication module 524. Power module 522 includes power switches 500. In some embodiments, power module 522 also includes microcontroller 502, gate driver 504, low power supply 506, and/or sensors 510. Communication module 524 includes wireless module 508 and antenna 512. Ground assembly 520 is configured to electrically couple power module 522 and communication module 524 together through a high-frequency impedance conductive path and parasitic capacitances as described herein.

Figure 6:
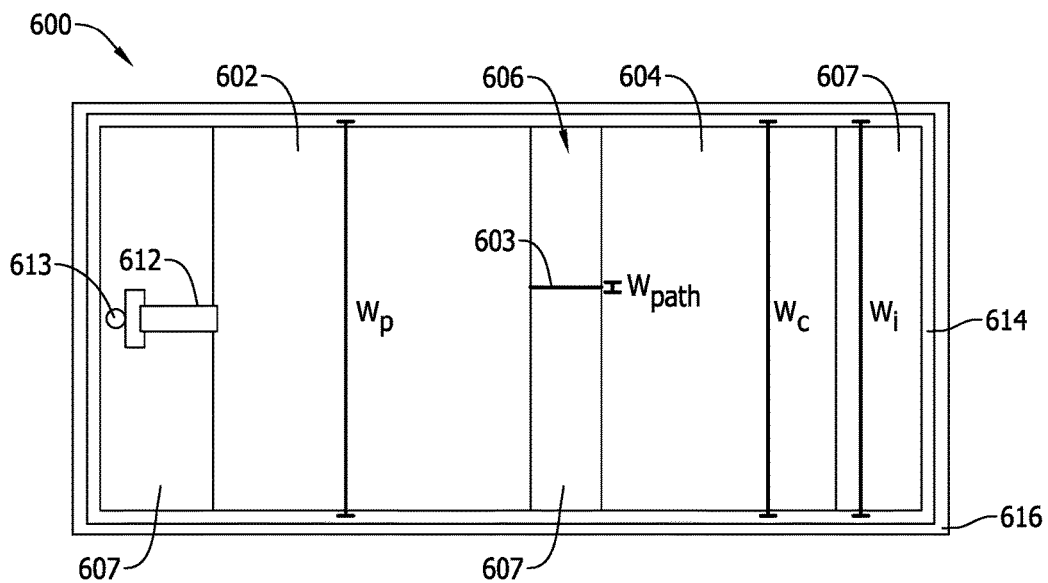
FIG. 6 is a top plan view of an exemplary ground assembly for use with the motor management module shown in FIG. 5.
Figure 7:
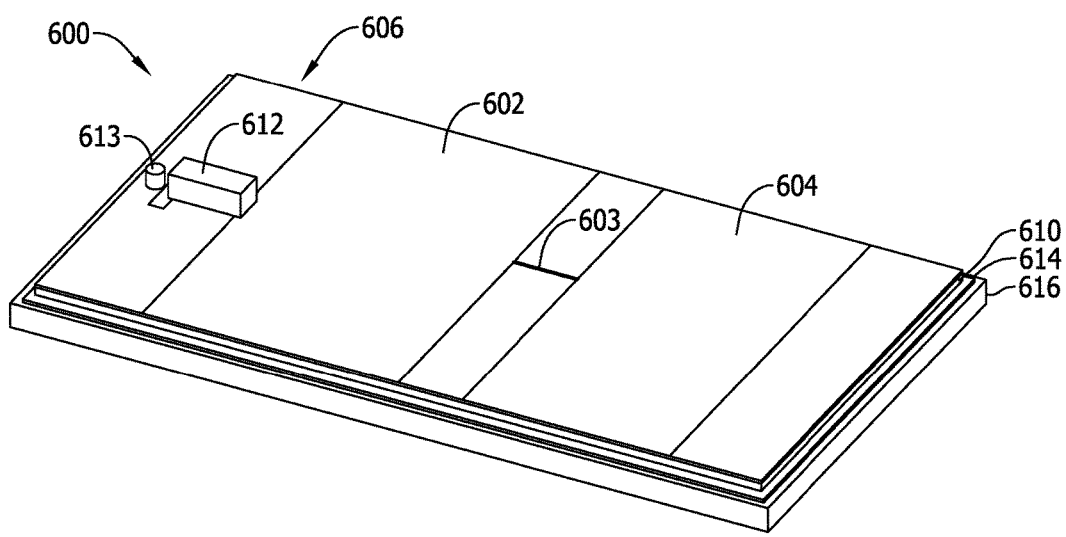
FIG. 7 is a perspective view of the ground assembly shown in FIG. 6.
Figure 8:
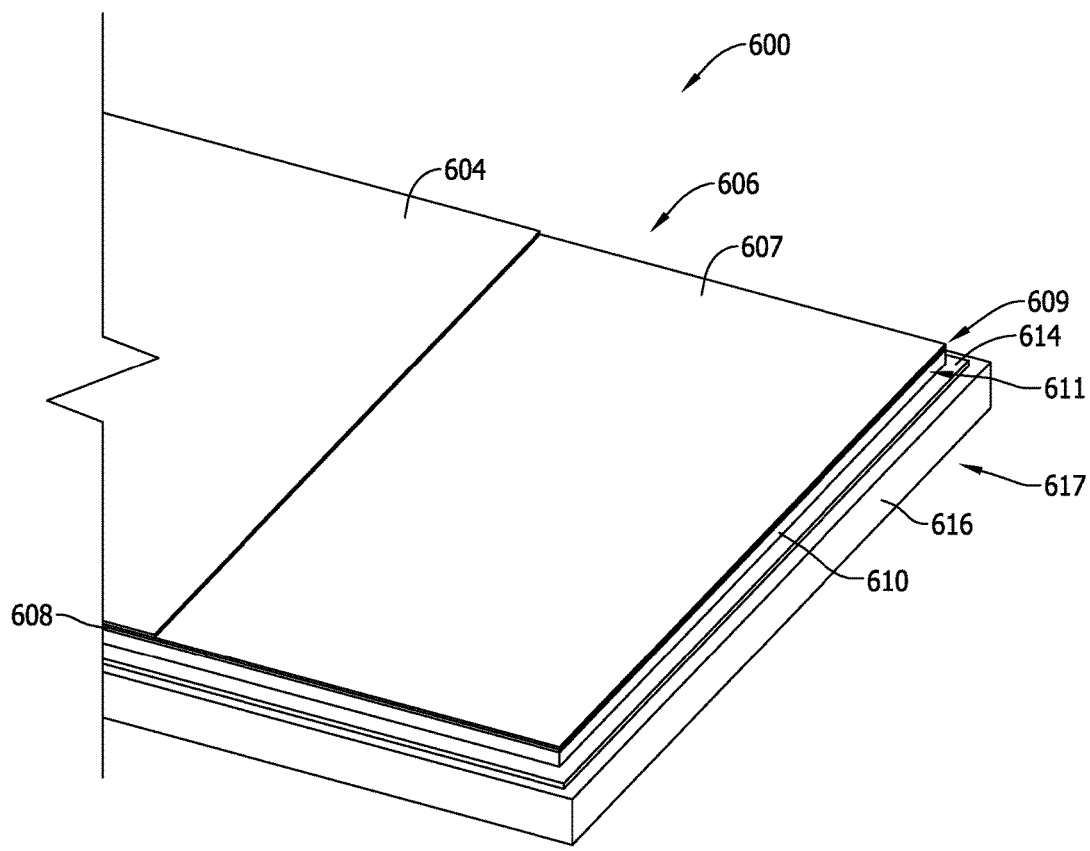
FIG. 8 is a partial perspective view of the ground assembly shown in FIG. 6.

FIGS. 6-8 show an exemplary ground assembly 600 for used with motor management module 210 (shown in FIG. 1). More specifically, FIG. 6 is a top plan view of ground assembly 600, FIG. 7 is a perspective view of ground assembly 600, and FIG. 8 is a partial perspective view of ground assembly 600. In certain embodiments, ground assembly 600 may have a different suitable configuration to function as described herein.

With respect to FIGS. 6-8, ground assembly 600 includes a power ground 602, a conductive path 603, a communication ground 604, an insulating layer 606, a dielectric layer 608 (shown in FIG. 8), a first substrate 610 (shown in FIGS. 7 and 8), a bypass capacitor 612, a thermal interface 614, and a second substrate 616. In other embodiments, ground assembly 600 includes additional, fewer, or alternative components, including those described elsewhere herein.

In the exemplary embodiment, ground assembly 600 includes a first layer 609, a second layer 611, and a third layer 617 (all shown in FIG. 8). First layer 609 includes power ground 602, conductive path 603, communication ground 604, and insulating layer 608. Second layer 611 includes first substrate 610, and third layer 617 includes second substrate 616. In other embodiments, layers 609, 611, 617 may include additional, fewer, or alternative sublayers or components, including those described elsewhere herein. Second layer 611 is coupled between first and third layers 609, 617 in an assembled, stacked configuration. Dielectric layer 608 is coupled between first layer 609 and second layer 611 as described herein. Thermal interface 614 is coupled between second layer 611 and third layer 617 as described herein.

Power ground 602, conductive path 603, and communication ground 604 are formed from an electrically conductive material (e.g., copper). Power ground 602, conductive path 603, and/or communication ground 604 may be formed from the same materials as each other or different materials. Power ground 602 is configured to electrically couple to power module 522 (shown in FIG. 5). Communication module 604 is configured to electrically couple to communication module 524 (shown in FIG. 5). Conductive path 603 extends between power ground 602 and communication ground 604 and is electrically coupled between power ground 602 and communication module 604. Conductive path 603 is configured to define a parasitic impedance and operate as a choke as described herein. That is, conductive path 603 is configured to block high-frequency current from passing between power ground 602 and communication ground 604, while low-frequency current (e.g., DC current) can pass through.

In the exemplary embodiment, insulating layer 606 extends beneath power ground 602 and communication ground 604 between grounds 602, 604 and dielectric layer 608. Insulating layer 606 includes a plurality of insulating strips 607 positioned adjacent power ground 602 and communication ground 604. At least one insulating strip 607 is positioned between power ground 602 and communication ground 604 such that power ground 602 and communication ground 604 do not directly contact each other. In some embodiments, power ground 602 and/or communication ground 604 are coupled directly to dielectric layer 608. In such embodiments, insulating strips may be isolated from each other.

Insulating layer 606 has a width $W_i$ that is substantially similar to a width $W_p$ of power ground 602 and a width $W_c$ of communication ground 604. In other embodiments, the width $W_i$ of insulating layer 606 may be greater than or less than the width $W_p$ of power ground 602 and/or the width $W_c$ of communication ground 604. A width $W_{path}$ of conductive path 603 is substantially less than widths $W_i$, $W_p$, and $W_c$. The width $W_{path}$ of conductive path 603 is selected to define a parasitic inductance sufficient to enable ground assembly 600 to function as described herein.

Insulating layer 606 is formed from an electrically insulating material or combination of materials, such as an FR-4 printed circuit board (PCB). In one example, insulating layer 606 is an electrical insulator that is thermally conductive. In some embodiments, insulating layer 606 may include other grounds, traces, wires, and/or mounting points for coupling to components other than power module 522 and communication module 524.

In the exemplary embodiment, dielectric layer 608 is positioned between first substrate 610 and power ground 602, communication ground 604, and insulating layer 606. Dielectric layer 608 is configured to facilitate forming parasitic capacitances between first substrate 610 and grounds 602, 604. Dielectric layer 608 is formed from any suitable material or combination of materials to facilitate the functions of ground assembly 600 as described herein. For example, dielectric layer 608 may be formed from air, polyethylene, polypropylene, and/or polyimide.

First substrate 610 is coupled to and positioned between dielectric layer 608 and thermal interface 614. In the exemplary embodiment, first substrate 610 is an electrically conductive substrate. In one example, first substrate 610 is an aluminum substrate. First substrate 610 is spaced from power ground 602 and communication ground 604 by dielectric layer 608 to define a pair of respective parasitic capacitances as described herein.

Bypass capacitor 612 is electrically coupled between power ground 602 and first substrate 610. In the exemplary embodiment, an electrically conductive fastener 613 (e.g., a screw, a bolt, a wire, etc.) extends through insulating and contacts first substrate 610 at a first end. Bypass capacitor 612 is electrically coupled to first substrate by electrically coupling to fastener 613 at a second end opposite the first end.

Thermal interface 614 is positioned between first and second substrates 610, 616. Thermal interface 614 is formed from a thermally conductive material or combination of materials. In at least some embodiments, thermal interface 614 is an electrical insulator. Thermal interface 614 has a relatively low dielectric constant to limit or reduce the parasitic capacitance defined between substrates 610 and 616 comparing to other parasitic capacitances within ground assembly 600 as described herein. In one example, thermal interface 614 is a thermal paste applied between substrates 610, 616. In the exemplary embodiment, thermal interface 614 extends beyond a perimeter of first substrate 610 to extend a creepage path between first and second substrates 610, 616, thereby limiting shunt current between substrates 610, 616.

Second substrate 616 is an electrically conductive substrate and is formed from any suitable material or combination of materials to facilitate the functions associated with second substrate 616 as described herein. In one example, second substrate 616 is formed from aluminum. In the exemplary embodiment, second substrate 616 is the common or global ground node for motor management module 210. Second substrate 616 is spaced from first substrate 610 by thermal interface 614 to define a parasitic capacitance therebetween. First substrate 610 is a floating with respect to second substrate 616. That is, no direct electrical connection (e.g., a conductor, a resistor, an inductor, etc.) is coupled between substrates 610, 616, and electric current flows between substrates 610, 616 via capacitive coupling.

In at least some embodiments, second substrate 616 is thermally conductive to enable ground assembly 600 to conduct and disperse heat from motor management module 210. In the exemplary embodiment, second substrate 616 is heatsink 214 of enclosure 54 (shown in FIGS. 3 and 4). In other embodiments, second substrate 616 is separate from enclosure 54. For example, second substrate 616 may be an aluminum panel positioned between heatsink 214 and thermal interface 614.

Figure 9:
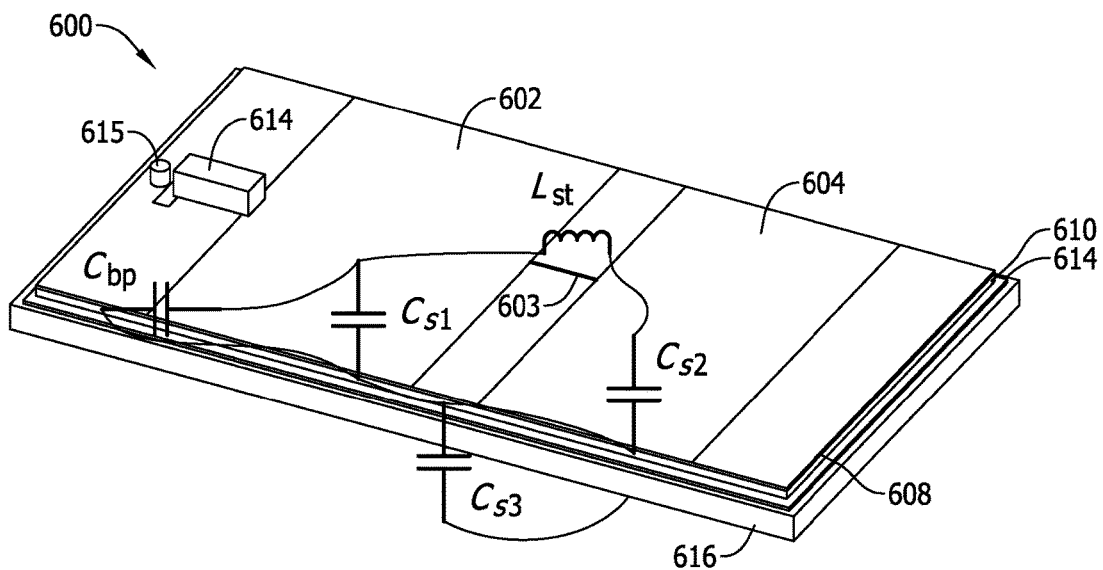
FIG. 9 is a perspective view of the ground assembly shown in FIGS. 6-8 with an exemplary parasitic model.
Figure 10:
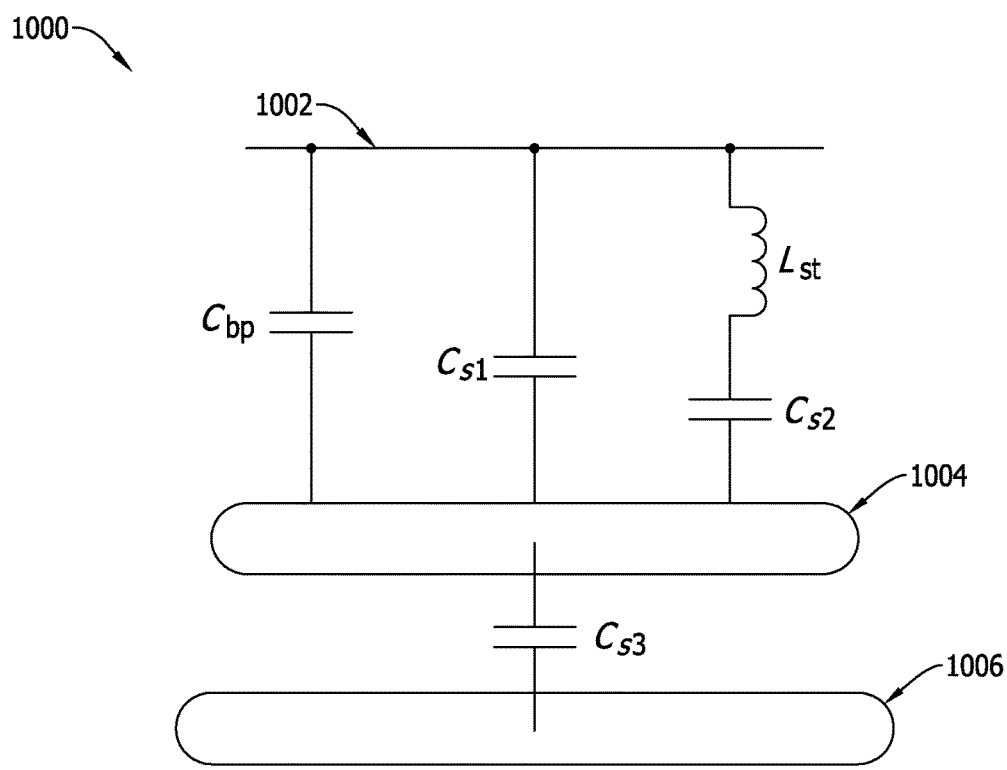
FIG. 10 is an exemplary circuit diagram of the parasitic model shown in FIG. 9.

FIGS. 9 and 10 depict an exemplary parasitic model of ground assembly 600 (shown in FIGS. 6-8). More specifically, FIG. 9 is a perspective view of ground assembly 600 with the parasitic model, and FIG. 10 is an exemplary circuit diagram 1000 of the parasitic model for assembly 600.

In the exemplary embodiment, power ground 602 and first substrate 610 define a first parasitic capacitance $C_{s1}$ therebetween. Communication ground 604 and first substrate 610 define a second parasitic capacitance $C_{s2}$ therebetween. First and second substrates 610, 616 define a third parasitic capacitance $C_{s3}$ therebetween. Bypass capacitor 612 defines a bypass capacitance $C_{bp}$. Conductive path 603 defines a parasitic inductance $L_{st}$ between power ground 602 and communication ground 604.

As shown in diagram 1000, the parasitic inductance $L_{st}$ is electrically in series with the second parasitic capacitance $C_{s2}$. The parasitic inductance $L_{st}$ and the second parasitic capacitance $C_{s2}$ are electrically in parallel with the first parasitic capacitance $C_{s1}$ and the bypass capacitance $C_{bp}$. As shown in diagram 1000, the parasitic capacitances $C_{s1}$, $C_{s2}$, the parasitic inductance $L_{st}$, and the bypass capacitance $C_{bp}$ are electrically coupled between a first node 1002 associated with power ground 602 and a second node 1004 associated with first substrate 610. The third parasitic capacitance $C_{s3}$ is coupled between second node 1004 and a third node 1006 associated with second substrate 616. The addition of the third parasitic capacitance $C_{s3}$ facilitates reducing the effective parasitic capacitance (i.e., the total capacitance) of ground assembly 600, which may reduce the effective parasitic capacitance of motor control assembly 55 (shown in FIG. 1).

Figure 11:
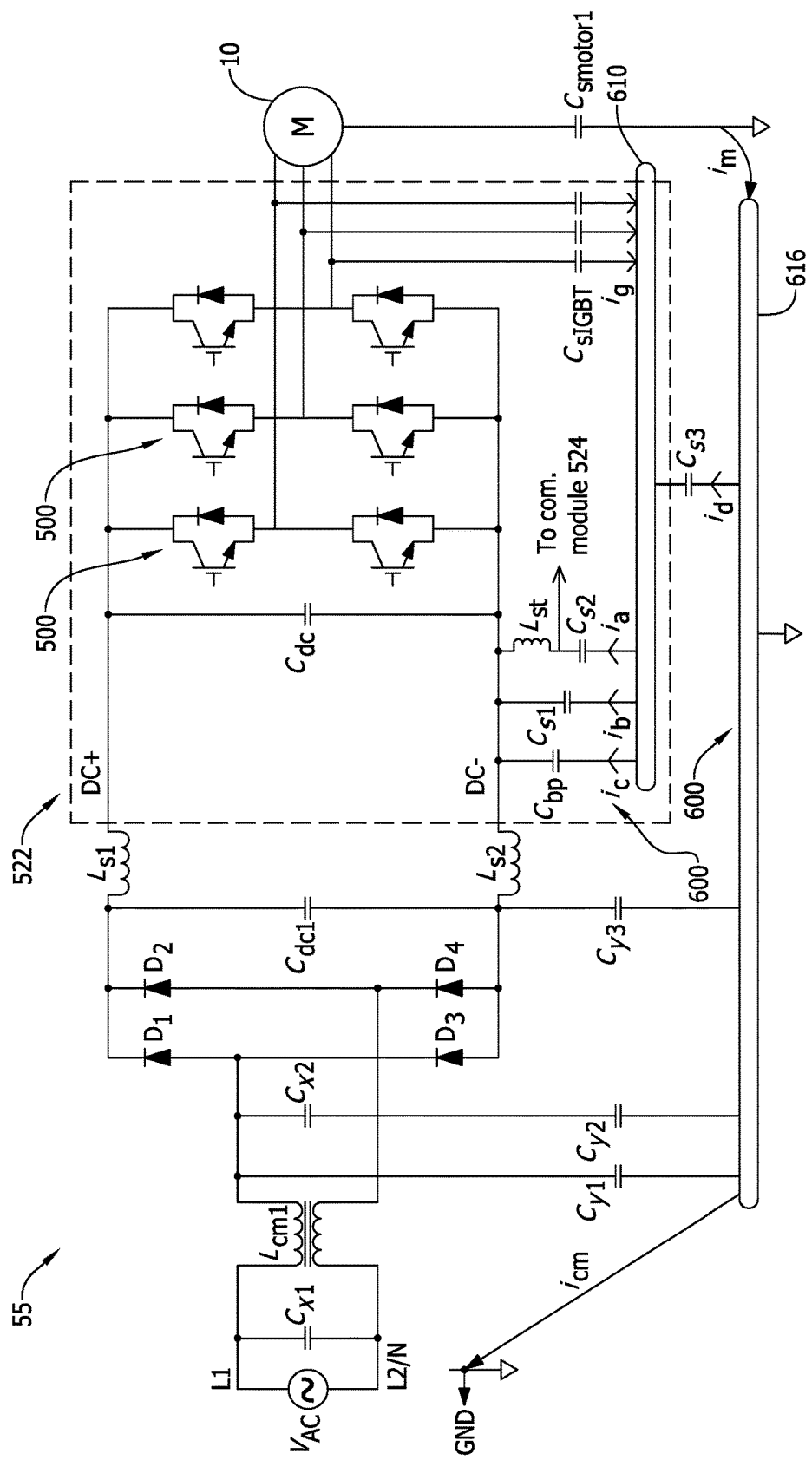
FIG. 11 is an exemplary circuit diagram of an exemplary system parasitic model for the motor control assembly shown in FIGS. 1-4.

FIG. 11 is an exemplary circuit diagram of a partial motor control assembly 55 (shown in FIG. 1) with ground assembly 600. In particular, FIG. 11 illustrates the effect of ground assembly 600 (shown in FIG. 6) on noise coupling currents from power module 522 (shown in FIG. 5) and motor 10 (shown in FIG. 1). Although not shown in FIG. 11, in the exemplary embodiment, communication module 524 (shown in FIG. 5) is electrically coupled between the parasitic inductance $L_{st}$ and the second parasitic capacitance $C_{s2}$.

Power module 522 is electrically coupled to second substrate 616 (i.e., the common or global ground for assembly 55) via the parasitic capacitances of power module 522 and ground assembly 600. Power switches 500 define a pair of parasitic line inductances $L_{s1}$, $L_{s2}$ and a plurality of parasitic capacitances $C_{sps}$ due to the switching of power switches 500. A noise coupling current $i_g$ from the parasitic capacitances $C_{sps}$ is generated from the power provided to motor 10 by switches 500. The coupling current $i_d$ is channeled through first substrate 610. Motor 10 defines a parasitic capacitance $C_{smotor1}$ between shaft 20 (shown in FIG. 1) of motor 10 and enclosure 54. A motor coupling current $i_m$ is generated from the common mode switching of power switches through motor shaft 20 and enclosure 54 (i.e., second substrate 616).

Based at least upon the coupling currents $i_g$ and $i_m$, a first coupling current $i_a$, a second coupling current $i_b$, a third coupling current $i_c$, and a fourth coupling current $i_d$ may be directed through ground assembly 600. In the exemplary embodiment, the bypass capacitance $C_{bp}$ is greater than the first and second parasitic capacitances $C_{s1}$, $C_{s2}$ such that the third coupling current $i_c$ is substantially greater than the first and second coupling currents $i_a$, $i_b$. That is, the bypass capacitance $C_{bp}$ facilitates directing at least a portion of the noise coupling currents $i_g$ and $i_m$ away from communication module 524, thereby reducing the noise affecting communications of communication module 524. Directly coupling communication ground 604 to first substrate 610 and/or second substrate 616 rather than via capacitive coupling may result in a large portion of the coupling current $i_g$ being channeled to communication module 524.

The parasitic inductance $L_{st}$ acts as a choke between the negative DC bus (DC−) and communication module 524. More specifically, the parasitic inductance $L_{st}$ defined by conductive path 603 blocks or prevents relatively high frequency noise from traveling to communication module 524. The high frequency noise may have a greater impact on communications of communication module 524 than in comparison to relatively low frequency current that passes through the choke defined by conductive path 603.

Isolating or limiting noise received by communication module 524 from other components of control assembly 55 (e.g., power module 522) facilitates improved communication range, quality, and/or functionality of communication module 524, thereby enabling communication module 524 to receive a motor control command signal and facilitate operation of control assembly 55 and motor 10 based upon the motor control command signal.

Figure 12:
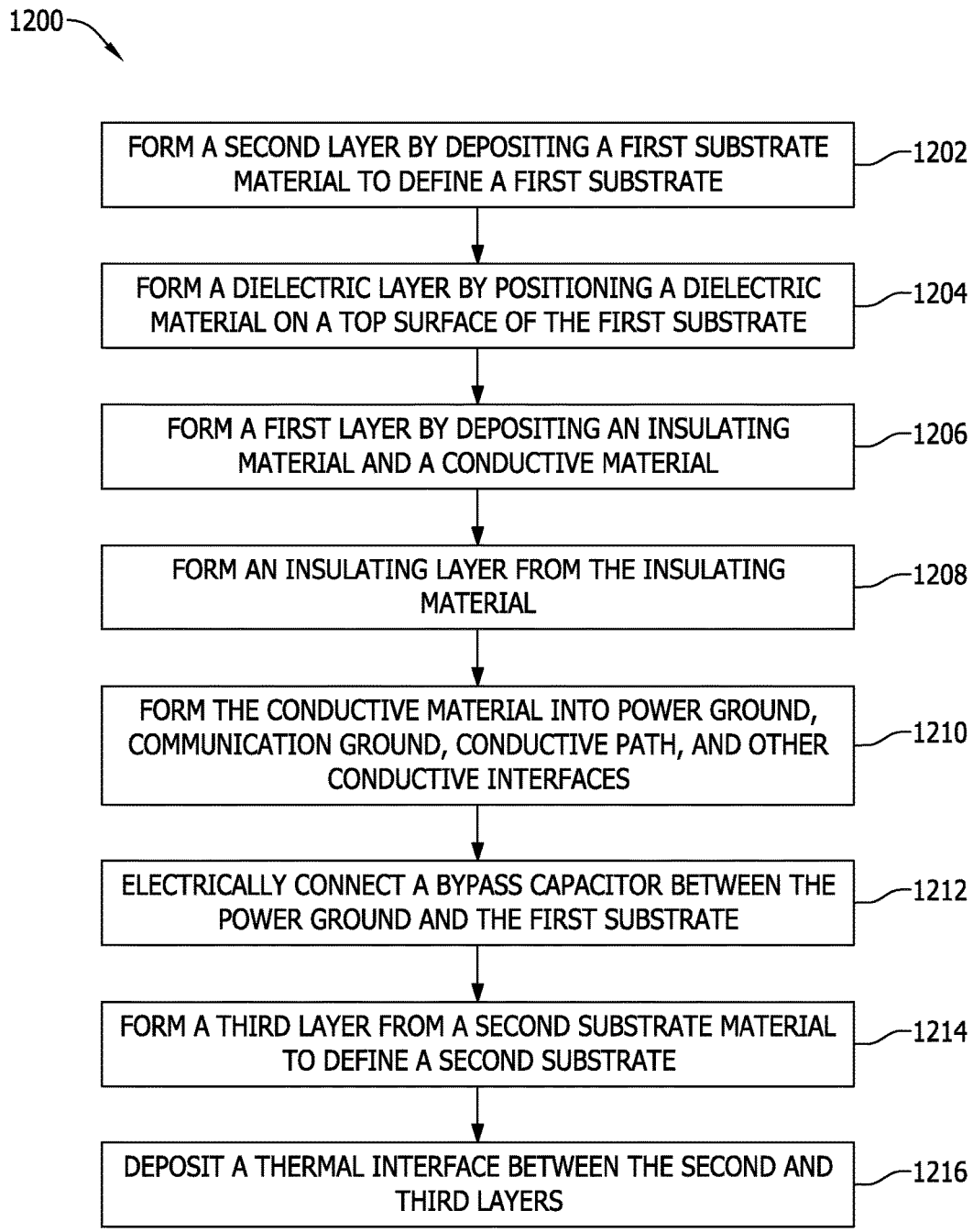
FIG. 12 is a flow diagram of an exemplary method of manufacturing a ground assembly in accordance with the embodiments described herein.

FIG. 12 is a flow diagram of an exemplary method 1200 of manufacturing a ground assembly in accordance with the embodiments described herein. In the exemplary embodiment, method 1200 is performed to form ground assembly 600 (shown in FIGS. 6-8). It is to be understood that the steps described herein may be performed using any suitable manufacturing equipment, techniques, and/or materials (or combinations of materials) that enable ground assembly 600 to be manufactured as described herein. In some embodiments, method 1200 may include additional, fewer, or alternative steps, including those described elsewhere herein.

With respect to FIGS. 6-8 and 12, second layer 611 is formed at step 1202 by depositing a first substrate material to define first substrate 610. In one embodiment, the first substrate material is formed in a mold in the shape of first substrate 610. Dielectric layer 608 is formed at step 1204 by positioning a dielectric material on a top surface (i.e., the surface facing first layer 609). In one example, a dielectric material is deposited on first substrate 610. First layer 609 is formed at step 1206 is formed by depositing an insulating material and a conductive material. In the exemplary embodiment, the insulating material is deposited on dielectric layer 608 to form at step 1208 insulating layer 606. The conductive material is formed at step 1210 into grounds 602, 604, conductive path 603, and any conductive contacts used by bypass capacitor 612. In one example, etching may be used to remove excess conductive material and define grounds 602, 604 and/or conductive path 603. Bypass capacitor 612 is electrically connected at step 1212 between power ground 602 and first substrate 610. In some embodiments, an electrically conductive fastener 613 is inserted through insulating layer 606 and dielectric layer 608 such that a first end of the fastener is in contact with first substrate 610. In such embodiments, bypass capacitor 612 is electrically coupled to a second end of fastener 613.

In certain embodiments, first and second layers 609, 611 may be assembled as a motor management module 210 for a motor control assembly 55 (both shown in FIG. 1). Third layer 617 is formed at step 1214 by depositing a second substrate material to define second substrate 616. In the exemplary embodiment, third layer 617 is part of enclosure 54 (shown in FIG. 1), and thereby is formed during the manufacture of enclosure 54. To couple second and third layers 611, 617 together, thermal interface 614 is deposited at step 1216 between second and third layers 611, 617. In some embodiments, thermal interface 614 may be deposited on second layer 611, third layer 617, or both layers 611, 617 prior to coupling layers 611, 617 together.

The methods and systems described herein may be implemented using computer programming or engineering techniques including computer software, firmware, hardware or any combination or subset thereof, wherein the technical effect may include at least one of: (a) isolating a wireless communication module of a motor control assembly from noise sources associated with power electronics of the assembly; (b) reducing overall parasitic capacitance of the motor control assembly by introducing additional parasitic capacitances in series with existing parasitic capacitances via a floating ground assembly; (c) maintaining a connection to a common ground while limiting noise coupled into the communication module from the common ground.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A ground assembly for a motor management module, said ground assembly comprising:
   a first layer comprising:
      a power ground;
      a communication ground spaced from said power ground;
      a conductive path electrically coupled between said power ground and said communication ground, wherein said conductive path defines a parasitic inductance; and
      an electrically insulating layer, wherein at least a portion of said insulating layer is positioned between said power ground and said communication ground;
   a second layer comprising a first substrate, wherein said first substrate is spaced from said power ground and defines a first parasitic capacitance therebetween, wherein said first substrate is spaced from said communication ground and defines a second parasitic capacitance therebetween; and a bypass capacitor electrically coupled between said power ground and said first substrate.

2. The ground assembly of claim 1 further comprising a third layer comprising a second substrate spaced from said first substrate to define a third parasitic capacitance therebetween, wherein said second layer is positioned between said first layer and said third layer.

3. The ground assembly of claim 2 further comprising a thermal interface coupled between said second layer and said third layer, wherein said thermal interface is thermally conductive.

4. The ground assembly of claim 1, wherein said bypass capacitor has a capacitance greater than said first parasitic capacitance and greater than said second parasitic capacitance.

5. The ground assembly of claim 1, wherein a width of said conductive path is less than a width of said power ground and less than a width of said communication ground.

6. The ground assembly of claim 1 further comprising a dielectric layer positioned between said first layer and said second layer.

7. The ground assembly of claim 1, wherein said parasitic inductance and said second parasitic capacitance are electrically coupled in parallel to said first parasitic capacitance and said bypass capacitor.

8. The ground assembly of claim 1 further comprising an electrically conductive fastener electrically coupled between said bypass capacitor and said first substrate, wherein said electrically conductive fastener extends through said insulating layer.

9. A motor control assembly comprising:
a motor management module comprising:
   a power module configured to generate a motor control signal associated with a motor;
   a communication module; and
   a ground assembly comprising:
      a first layer comprising:
         a power ground electrically coupled to said power module;
         a communication ground electrically coupled to said communication module and spaced from said power ground;
         a conductive path electrically coupled between said power ground and said communication ground, wherein said conductive path defines a parasitic inductance; and
         an electrically insulating layer, wherein at least a portion of said insulating layer is positioned between said power ground and said communication ground;
      a second layer comprising a first substrate, wherein said first substrate is spaced from said power ground and defines a first parasitic capacitance therebetween, wherein said first substrate is spaced from said communication ground and defines a second parasitic capacitance therebetween; and
      a bypass capacitor electrically coupled between said power ground and said first substrate.

10. The motor control module of claim 9, wherein the ground assembly further comprises a third layer comprising a second substrate spaced from said first substrate to define a third parasitic capacitance therebetween, wherein said second layer is positioned between said first layer and said third layer.

11. The motor control assembly of claim 10, wherein said ground assembly further comprises a thermal interface coupled between said second layer and said third layer, wherein said thermal interface is thermally conductive.

12. The motor control assembly of claim 10 further comprising an enclosure defining an internal chamber, wherein said power module and said communication module are positioned within said internal chamber.

13. The motor control assembly of claim 12, wherein said enclosure comprises heatsink, wherein said heatsink comprises said second substrate.

14. The motor control assembly of claim 9, wherein said bypass capacitor has a capacitance greater than said first parasitic capacitance and said second parasitic capacitance.

15. The motor control assembly of claim 9, wherein said ground assembly further comprises a dielectric layer between said first layer and said second layer.

16. The motor control assembly of claim 9, wherein said ground assembly further comprises an electrically conductive fastener electrically coupled between said bypass capacitor and said first substrate, wherein said electrically conductive fastener extends through said insulating layer.

* * * * *